United States Patent
Matsui

(10) Patent No.: US 10,902,808 B2
(45) Date of Patent: Jan. 26, 2021

(54) TOUCH PANEL DISPLAY AND CONTROL METHOD OF TOUCH PANEL DISPLAY

(71) Applicant: SHARP KABUSHIKI KAISHA, Sakai (JP)

(72) Inventor: Kuniaki Matsui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/577,662

(22) Filed: Sep. 20, 2019

(65) Prior Publication Data

US 2020/0105214 A1  Apr. 2, 2020

(30) Foreign Application Priority Data

Sep. 27, 2018 (JP) .................. 2018-181529

(51) Int. Cl.
| | |
|---|---|
| *G09G 3/36* | (2006.01) |
| *G06F 3/041* | (2006.01) |
| *G02F 1/1333* | (2006.01) |
| *G06F 3/044* | (2006.01) |

(52) U.S. Cl.
CPC ....... *G09G 3/3648* (2013.01); *G02F 1/13338* (2013.01); *G06F 3/044* (2013.01); *G06F 3/0412* (2013.01); *G09G 2310/08* (2013.01); *G09G 2330/021* (2013.01)

(58) Field of Classification Search
CPC ...... G06F 3/0412; G06F 3/044; G06F 3/0416; G06F 3/04184; G09G 3/3648; G09G 3/20; G09G 3/3674; G09G 3/3266; G09G 2330/021; G09G 2310/08; G09G 2310/0267; G09G 2310/063; G09G 2310/0286; G02F 1/13338; G11C 19/28
See application file for complete search history.

(56) References Cited

U.S. PATENT DOCUMENTS

| | | | | |
|---|---|---|---|---|
| 2008/0246739 | A1* | 10/2008 | Choi ................ | G02F 1/167 345/173 |
| 2013/0241814 | A1* | 9/2013 | Hirabayashi ......... | G06F 3/0445 345/100 |
| 2016/0188076 | A1* | 6/2016 | Hao .................... | G06F 3/0412 345/173 |
| 2016/0378232 | A1* | 12/2016 | Hsu ..................... | G09G 3/3677 345/174 |

FOREIGN PATENT DOCUMENTS

JP  09-128146 A  5/1997

* cited by examiner

*Primary Examiner* — Christopher E Leiby
(74) *Attorney, Agent, or Firm* — ScienBiziP, P.C.

(57) ABSTRACT

A touch panel display 10a includes a liquid crystal panel 32, a liquid crystal display timing controller (LCD-TCON) 34 that outputs a gate clock signal GCK 1a in a display period during which an image corresponding to an image signal D1 is displayed on the liquid crystal panel 32, a complex programmable logic device (CPLD) 54 that generates a gate clock signal GCK 2 which has the same cycle as the cycle of a gate clock signal GCK 1a, in a non-display period during which the image is not displayed on the liquid panel 32, and a touch panel control board 70 that drives a touch panel 36 in the display period on the basis of the gate clock signal GCK 1a output from the LCD-TCON 34 and that drives the touch panel 36 in the non-display period on the basis of the gate clock signal GCK 2 output from the LCD-TCON 34.

5 Claims, 9 Drawing Sheets

TOUCH PANEL DISPLAY AND CONTROL METHOD OF TOUCH PANEL DISPLAY

INCORPORATION BY REFERENCE

This application is based upon and claims the benefit of priority from the corresponding Japanese Patent Application No. 2018-181529 filed in Sep. 27, 2018, the entire contents of which are incorporated herein by reference.

BACKGROUND

1. Technical Field

The present disclosure relates to a touch panel display and a control method of a touch panel display. In particular, the present disclosure relates to a touch panel display including a display panel and a touch panel which is superposed on the display panel and outputs a position signal corresponding to a touch position where a user has a touch on the touch panel.

2. Description of the Related Art

A touch panel is one of pointing devices to be used in combination with a display device. The display device including the touch panel (an input display device) is called a touch panel display and is used for various apparatuses including an electronic apparatus such as a mobile apparatus, and a home electronic appliance.

As such a touch panel display, a combination of a touch panel of an electrostatic capacitive touch panel and an active-matrix liquid crystal display is known. In this combination, the touch panel is superposed on the liquid crystal display device, so that in response to a user's touch on the touch panel, the touch panel outputs the touch position where the user has the touch.

In the touch panel display, a liquid crystal display-timing controller (LCD-TCON) outputs a gate clock signal to a gate driver in a period of displaying an image corresponding to an input image signal (hereinafter, referred to as "a display period") on a screen of a liquid crystal panel. On the other hand, the liquid crystal display-timing controller does not output the gate clock signal to the gate driver in a period during which the image signal is not input, in other words, a period during which the image is not displayed on the screen of the liquid crystal panel (hereinafter, referred to as "a non-display period").

For this reason, the liquid crystal display-timing controller does not output the gate clock signal in the non-display period so that a drive signal of the touch panel cannot be generated. The touch panel is inoperative in the non-display period so that the touch panel is in a standby state (a sleep mode). When an external device (for example, a mouse and a keyboard) is connected with an external interface of the touch panel display, the touch panel can be restored to a normal state from the standby state on the basis of an input signal from the external device. But the external device is not connected with the external interface of the touch panel display, the touch panel cannot be restored to the normal state until the image signal is input. This may be a troublesome problem.

SUMMARY

The present disclosure is directed to providing a touch panel display which can prevent a touch panel from being inoperative in a non-display period during which an image is not displayed, and a control method of the touch panel display.

According to one aspect of the present disclosure, a touch panel display including a display panel and a touch panel which is superposed on the display panel and outputs a position signal corresponding to a touch position where a user has a touch on the touch panel, includes a timing controller that outputs a gate clock signal to control a drive timing of a gate line provided on the display panel, in a display period during which an image corresponding to an image signal is displayed on the display panel, a signal generator that generates the gate clock signal and a correction synchronizing signal which has the same cycle as the gate clock signal, in a non-display period during which the image is not displayed on the display panel, and a touch panel driver that drives the touch panel in the display period on the basis of the gate clock signal output from the timing controller and drives the touch panel in the non-display period on the basis of the correction synchronizing signal output from the signal generator.

According to another aspect of the present disclosure, a control method of a touch panel display including a display panel and a touch panel which is superposed on the display panel and outputs a position signal corresponding to a touch position where a user has a touch on the touch panel, includes outputting a gate clock signal to control a drive timing of a gate line provided on the display panel, in a display period during which an image corresponding to an image signal is displayed on the display panel, generating a correction synchronizing signal which has the same cycle as the gate clock signal, in a non-display period during which the image is not displayed on the display panel, and driving the touch panel in the display period on the basis of the gate clock signal output from the timing controller and driving the touch panel in the non-display period on the basis of the correction synchronizing signal.

The present disclosure can prevent the touch panel from being inoperative in the non-display period during which the image is displayed.

This Summary is provided to introduce a selection of concepts in a simplified form that are further described below in the Detailed Description with reference where proper to the accompanying drawings. This Summary is not intended to identify key features or essential features of the claimed subject matter, nor is it intended to be used to limit the scope of the claimed subject matter.

Furthermore, the claimed subject matter is not limited to implementations that solve any or all disadvantages noted in any part of this disclosure.

DETAILED DESCRIPTION

An exemplary embodiment will be described below referring to the accompanied drawings. The exemplary embodiment described below is one example embodying the present disclosure and does not limit the technical scope of the present disclosure.

The present disclosure is applied to a touch panel display, for example. Before describing the touch panel display which the present disclosure is applied to, a touch panel display illustrated for comparison with an exemplary embodiment of the invention is described.

Figure 1:
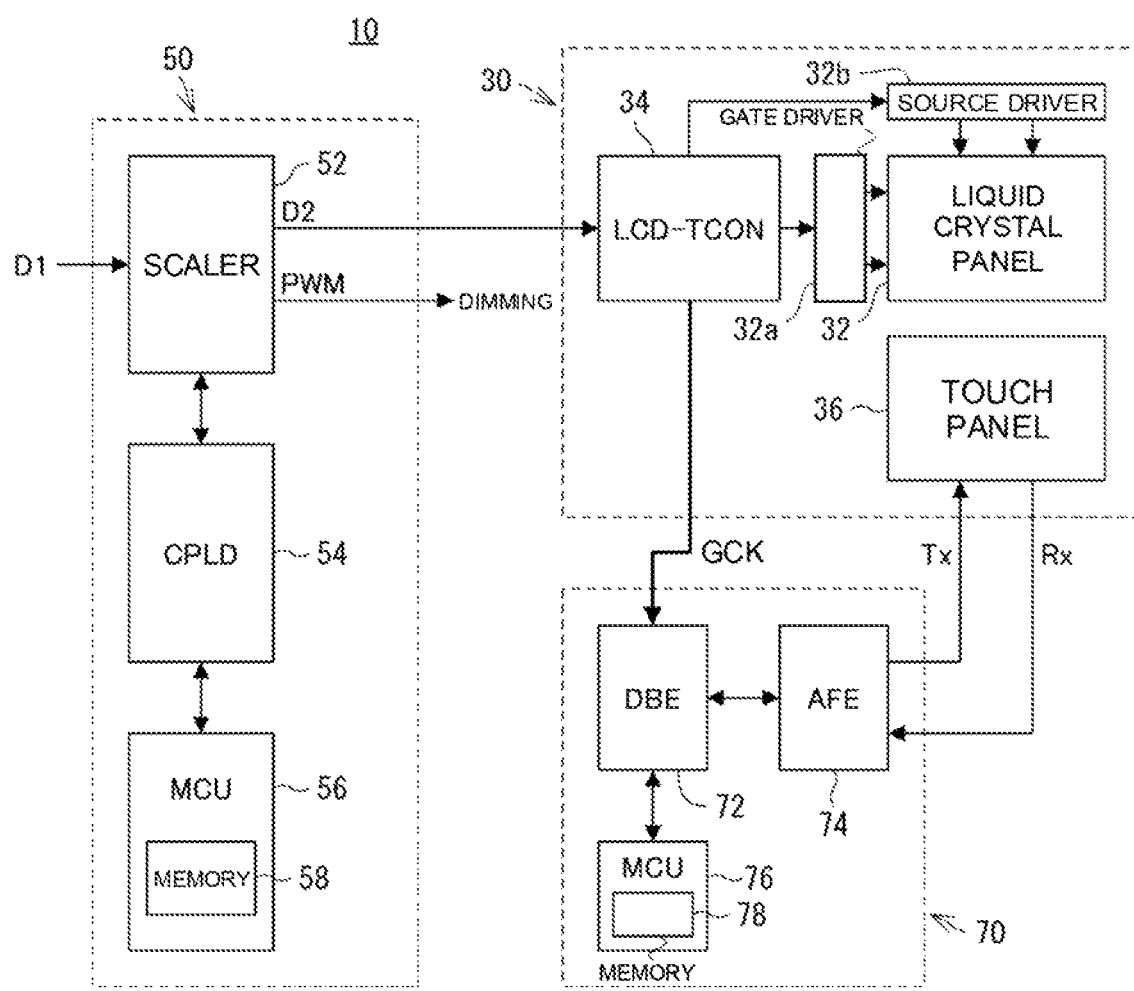
FIG. 1 is a block diagram showing a schematic configuration of an example of an electrical part of a touch panel display illustrated for comparison with an exemplary embodiment of the invention.

FIG. 1 is a block diagram illustrating a schematic configuration of an electrical part of a touch panel display 10 illustrated for comparison with an exemplary embodiment of the invention. As illustrated in FIG. 1, the touch panel display 10 includes a liquid crystal module 30, a main interface board 50, and a touch panel control board 70.

The liquid crystal module 30 includes an active-matrix liquid crystal panel 32, a gate driver 32a (a gate drive), and a source driver 32b, a liquid crystal display-timing controller (LCD-TCON) 34, and a touch panel 36

While detailed illustration is omitted in FIG. 1, the liquid crystal panel 32 includes a deflection filter, a glass board, a liquid crystal layer, a backlight, and the like, to form a screen (an image display portion) that displays information such as an image described below. For example, the number of pixels in a horizontal direction and a vertical direction of the screen is 1920×1080 or 3840×2160. Wirings including a gate line (a scan line) and a source line (a data line), a thin film transistor (TFT), an electrode including a pixel electrode and a common electrode, and the like are formed on the glass board.

As described below, the liquid crystal display-timing controller 34 inputs a gate line control signal such as a gate clock signal GCK which controls a driving timing of the gate line, and a gate start pulse signal GSP, into the gate driver 32a. The gate driver 32a controls the thin film transistor TFT in accordance with the gate line control signal so that the thin film transistor TFT of the liquid crystal panel 32 is turned on in order of the gate line.

As described below, the liquid crystal display-timing controller 34 inputs a source line control signal and an image data signal DT to the source driver 32b. The source driver 32b inputs the image data signal DT to each source line in accordance with the source line control signal.

Therefore, electrical voltage corresponding to the image data signal DT is applied to a pixel (a liquid crystal) corresponding to a thin film transistor TFT which is turned on. In other words, data is written.

The liquid crystal display-timing controller 34 controls the gate driver 32a and the source driver 32b on the basis of an image signal D2, so that an image according to the image signal D2 is displayed on a screen of the liquid crystal panel 32. Specifically, the liquid crystal display-timing controller 34 inputs the gate line control signal such as the gate clock signal GCK and the gate start pulse signal GSP to the gate driver 32a. The liquid crystal display-timing controller 34 inputs the source line control signal and the image data signal DT to the source driver 32b.

The touch panel 36 is of a mutual capacitive method included in a projected capacitive method. While detailed illustration is omitted in FIG. 1, the touch panel 36 includes electrostatic capacitive sensor sheet and is superposed on the screen of the liquid crystal panel 32 by direct bonding. Also, the touch panel 36 includes a drive electrode and a reception electrode. A drive signal Tx to drive the touch panel 36 is input to the drive electrode.

When a user has a touch on the touch panel 36 under a condition that the drive signal Tx is input, the touch panel 36 outputs a position signal Rx corresponding to a touch position where the user has the touch on the touch panel 36. The position signal Rx is a current signal.

The main interface board 50 includes a scaler (an image signal converter) 52, a complex programmable logic device (CPLD) 54, and a micro control unit (MCU) 56. The scaler 52 can receive an input of an image signal D1 conforming to various standards such as a display port and a high-definition multimedia interface (HDNI). The scaler 52 converts the input image signal D1 to the image signal D2 that is suitable to a signal input condition of the liquid crystal module 30 and inputs the image signal D2 to the liquid crystal display-timing controller 34 of the liquid crystal module 30. The image signal D2 includes a horizontal synchronizing signal HS, a vertical synchronizing signal VS, a dot clock signal DCK, the image data signal DT, and the like. The scaler 52 has a function to output a pulse width modulation (PWM) signal, for example. The PWM signal is used as a dimming signal to adjust brightness of the backlight of the liquid crystal modules. The backlight is not illustrated. The scaler 52 outputs a signal which synchronizes with the horizontal synchronizing signal HS contained in the image signal D2.

In other words, the scaler 52 has a function to generate the PWM signal which synchronizes with the horizontal synchronizing signal HS. More specifically, the scaler 52 has the function to generate not only the PWM signal but also a signals of other format that synchronizes with the horizontal synchronizing signal HS. Such a scaler 52 may be realized by an application specific integrated circuit (ASIC).

The CPLD 54 is connected with the scaler 52. The CPLD 54 has a function to increase the number of input-output ports of the main interface board 50 including an input-output port of the scaler 52, for example. The CPLD 54 has another function to serve as a bus selector to divide a bus line within the main interface board 50 into a plurality of bus lines and to perform switching of the divided bus lines.

Also, the CPLD 54 has still another function to generate various pulse signals to be used as a reference signal in a peripheral circuit. Therefore, the CPLD 54 has a general-purpose function.

The MCU 56 controls a proper element which is mounted on the main interface board 50 including the CPLD54. The MCU 56 accomplishes each of the above-described functions of the CPLD 54. The MCU 56 has a built-in memory 58. The memory 58 stores a control program to control an operation of the MCU 56. The control program is described below.

The touch panel control board 70 includes a digital back end (DBE) 72, an analog front end (AFE) 74, and an MCU 76.

The DBE 72 cooperates with the AFE 74 to generate the drive signal Tx and input the drive signal Tx into the touch panel 36. The DBE 72 cooperates with the AFE 74 to receive the position signal Rx which the touch panel 36 outputs, and to generate a position data signal indicating the touch position where the user has a touch on the touch panel 36, on the basis of the position signal Rx and the drive signal Tx. The position data signal is input to main MCU of the touch panel display 10 and is used for processing which the main MCU executes, in accordance with the needs. The main MCU is not illustrated.

The MCU 76 of the touch panel control board 70 controls a proper element which is mounted on the touch panel control board 70 including the DBE 72. For example, a cycle of the drive signal Tx that is a pulse type, the number of times of scanning the drive signal Tx, a changing cycle between the drive signal Tx and the position signal Rx (in other word, a switching cycle between the drive electrode and the reception electrode), and the like are decided depending on an operation of the DBE 72, and the operation of the DBE 72 is controlled by the MCU 76. Also, the MCU 76 has a built-in memory 78. The memory 78 stores a touch panel control program to control an operation of the MCU 76.

In the touch panel display 10, once the image signal D1 is input to the scaler 52, the scaler 52 converts the input image signal D1 to the image signal D2 and inputs the image signal D2 to the liquid crystal display-timing controller 34. The liquid crystal display-timing controller 34 controls the gate driver 32*a* and the source driver 32*b* based on the image signal D2 so that the liquid crystal 32 is driven by an active-matrix driving method. Due to this, the gate line control signal such as the gate clock signal GCK and the gate start pulse signal GSP is input from the liquid crystal display-timing controller 34 to the gate driver 32*a*, as described above. In addition, the source line control signal and the image data signal DT are input from the liquid crystal display-timing controller 34 to the source driver 32*b*. In accordance with this, the gate driver 32*a* properly controls the thin film transistor TFT of the liquid crystal panel 32, and the source driver 32*b* properly writes data into each pixel. Therefore, the image according to the image signal D2 is displayed on the screen of the liquid crystal panel 32.

Concurrently, the touch panel control board 70 inputs the drive signal Tx to the touch panel 36. In this state, if the user has a touch on the touch panel 36, the touch panel 36 outputs the position signal Rx corresponding to the touch position where the user has the touch on the touch panel 36. The position signal Rx is input to the touch panel control board 70 and used, together with the drive signal Tx, in the processing to generate the position data signal. In this manner, the main interface board 50 and the touch panel control board 70 control the touch panel 36 that is superposed on the liquid crystal panel 32 and outputs the position signal Rx corresponding to the touch position where the user has the touch.

By the way, in the touch panel display 10, it may happen that a gate drive noise N which is caused by driving of a gate line (a gate of the thin film transistor TFT) of the liquid crystal panel 32 appears on a reception side of the AFE 74 which is an input destination of the position signal Rx. The larger a sensor surface of the touch panel is (in other word, the larger the screen of the liquid crystal panel 32 is), the more often the gate drive noise N appears. The smaller a mutual distance between the touch panel 36 and the screen of the liquid crystal panel 32, the more often and the more significantly the gate drive noise N appears especially in the configuration in which the touch panel 36 is superposed on the screen of the liquid crystal panel 32 by direct bonding as described above. If the gate drive noise N appears, the touch panel may be falsely recognized as if the user touched the touch panel 36 even when the user dose not has a touch on the touch panel 36. In other word, the touch panel 36 (strictly speaking, a touch panel system including the touch panel 36 and the touch panel control board 70) malfunctions. Therefore, the affection of the gate drive noise N has to be avoided.

Figure 2:
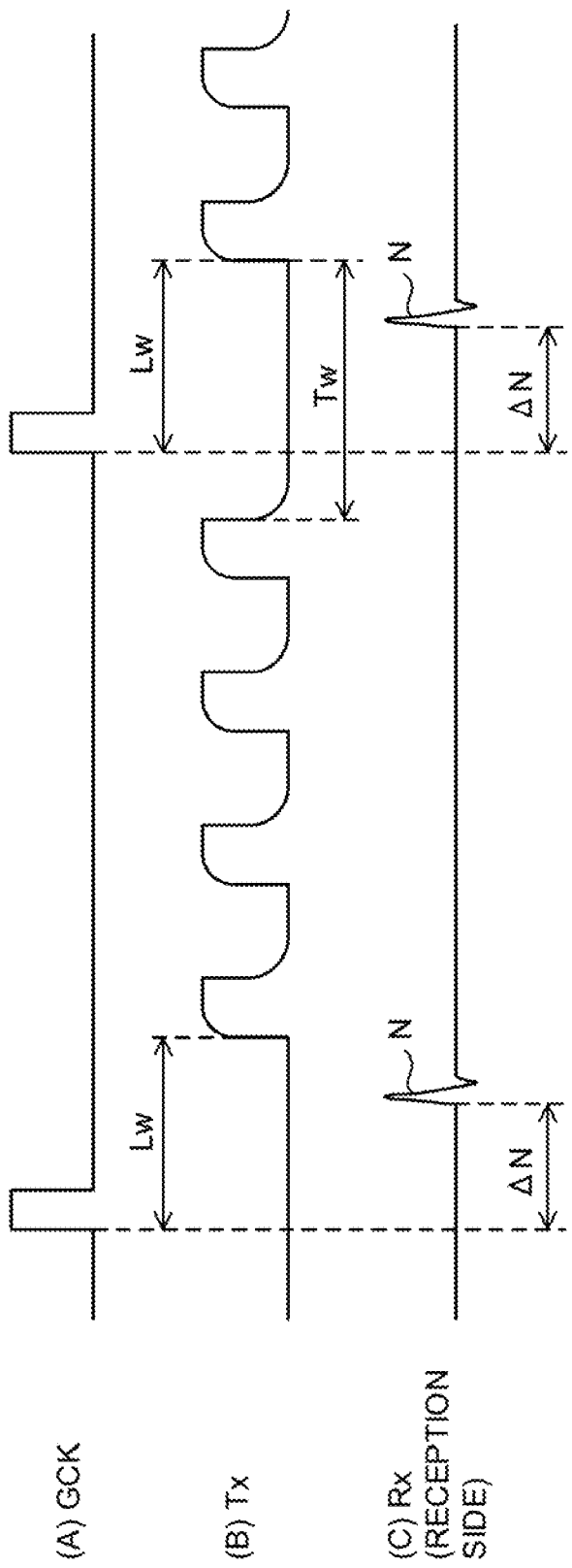
FIG. 2 is a waveform diagram showing one example of a gate clock signal, a drive signal of the touch panel, and a gate drive noise in the touch panel display illustrated for comparison with an exemplary embodiment of the invention.

The gate drive noise N occurs at a timing that synchronizes with a cycle of the gate clock signal GCK to drive the gate line of the liquid crystal panel 32. Strictly speaking, the gate drive noise N occurs at the timing having a constant delay time AN with respect to the gate clock signal GCK, as illustrated in FIG. 2. Here, FIG. 2A illustrates the gate clock signal GCK. FIG. 2B illustrates the drive signal Tx of the touch panel 36. FIG. 2C illustrates waveforms of the position signal Rx on the reception side of the AFE 74 that is the input destination of the position signal Rx, in a case where the user does not have a touch on the touch panel 36. As illustrated in FIG. 2C, the gate drive noise N appears on the reception side of the AFE 74 that is the input destination of the position signal Rx, even when the user does not have the touch on the touch panel 36. The delay time AN of the gate drive noise N with respect to the gate clock signal GCK is caused by responsiveness of the liquid crystal panel 32, responsiveness of the touch panel 36, or the like and is constant as described above.

In view of the above-described relationship between the gate drive noise N and the gate clock signal GCK, the occurrence timing of the gate drive noise N may be estimated, for example, based on the gate clock signal GCK. and, the affection of the gate drive noise N may be avoided according to the estimation. For example, in the configuration in which the liquid crystal display-timing controller 34 inputs the gate clock signal GCK to the DBE 72 as illustrated in FIG. 1, the DBE 72 cooperates with the AFE 74 to generate the drive signal Tx which takes into consideration the delay time AN, on the basis of the gate clock signal GCK, and then inputs the drive signal Tx to the touch panel 36. According to this operation of the DBE 72 and the AFE 74, the affection of the gate drive noise N can be avoided.

However, in a case of the configuration in which the DBE 72 generates the drive signal Tx based on the gate clock signal GCK obtained from the liquid crystal display-timing controller 34 and the delay time AN, the input of the drive signal Tx to the touch panel 36 is halted for a predetermined standby period Lw from a start timing of the gate clock signal GCK. Specifically, generation of a pulse of the drive signal Tx is halted. Therefore, an operation of the touch panel 36 is inoperative in the standby period Lw. For this reason, as illustrated in FIG. 2, scanning processing (position detection processing) is not executed in an inoperative period Tw within one frame period. The number of times of the scanning processing for the touch panel 36 within the one frame period decreases (four times in FIG. 2) and accuracy of position detection degrades. This may be a troublesome problem.

In the touch panel display 10, other problems may happen as described below. Specifically, in the touch panel display 10, the liquid crystal display-timing controller 34 outputs the gate clock signal GCK to the gate driver 32a and the DBE 72 in a period during which that the image corresponding to the input image signal D1 is displayed on the liquid crystal panel 32 (display period). On the other hand, the liquid crystal display-timing controller 34 does not output the gate clock signal GCK to the gate driver 32a and the DBE 72 in a period during which the image signal D1 is not input, that is, a period during which the image is not displayed on the liquid crystal panel 32 (non-display period).

Therefore, in the non-display period, since the DBE 72 cannot obtain the gate clock signal GCK so that the DEB cannot generate the drive signal Tx, the input of the drive signal Tx to the touch panel 36 is halted. That is, in the non-display period, the touch panel 36 is made inoperative and stays in a standby state (a sleep mode).

When an external device (for example, a mouse and a keyboard) is connected to an external interface of the touch panel display, the touch panel can restore a normal state from the standby state in the basis of an input signal from the external device. But the external device is not connected with the external interface of the touch panel display, the touch panel cannot restore the normal state until the image signal is input. This may be a troublesome problem.

To solve these problems, a touch panel 10a according to the present exemplary embodiment includes a configuration describe below.

Figure 3:
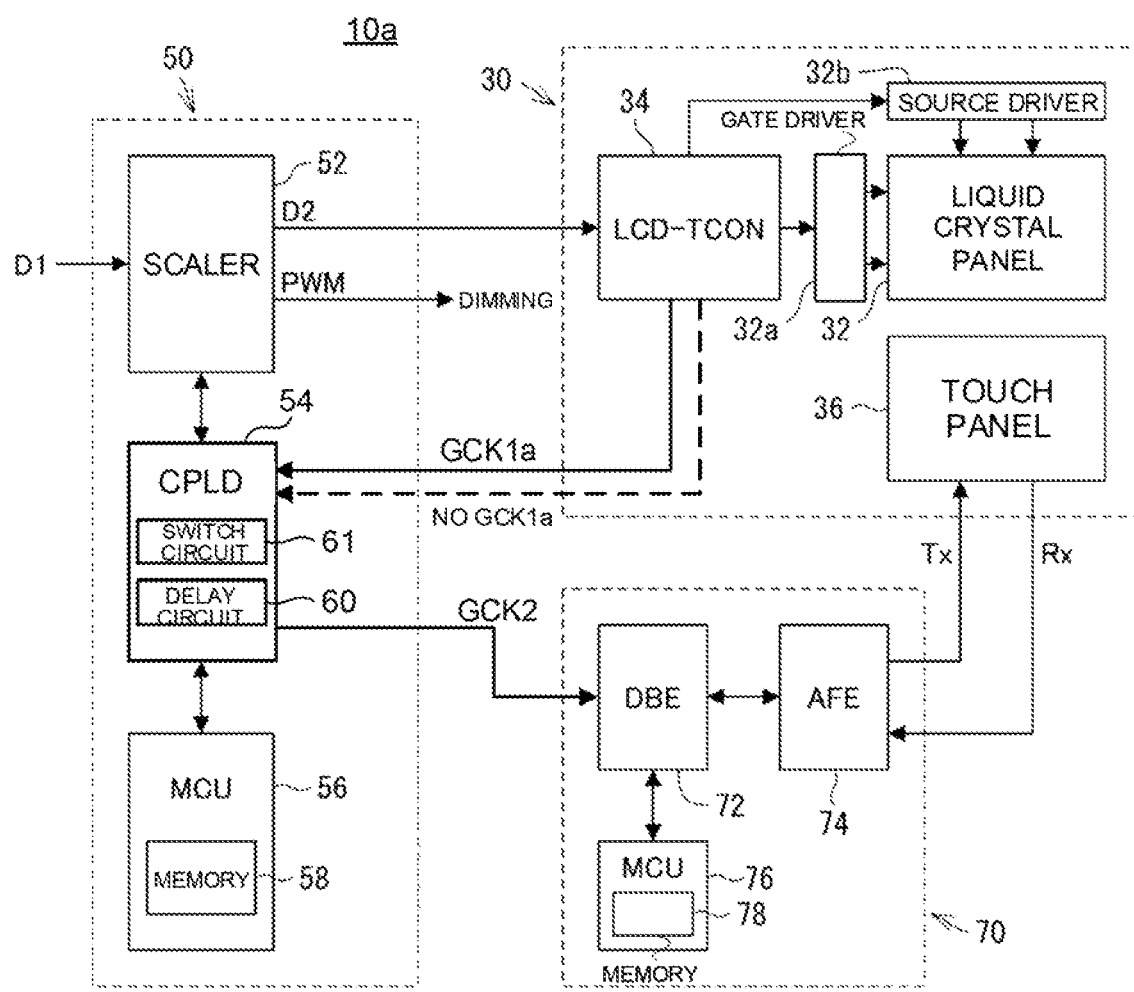
FIG. 3 is a block diagram illustrating a schematic configuration of an electrical part of a touch panel display according to an exemplary embodiment of the present disclosure.

Specifically, as illustrated in FIG. 3, in the touch panel 10a, a gate clock signal GCK1a generated by the liquid crystal display-timing controller 34 is input from the liquid crystal display-timing controller 34 to a gate driver 32a and the CPLD 54 of the main interface board 50. In addition, in the touch panel 10a, the CPLD 54 forms a delay circuit 60 and a switch circuit 61. The CPLD 54 has the general-purpose function describe above and has enough number of logic circuits to form the delay circuit 60 and the switch circuit 61. Other structures of the touch panel 10a according to the present exemplary embodiment are the same as those in the touch panel 10 illustrated in FIG. 1. Therefore, those same structure elements are denoted with the same reference numerals as in FIG. 1. Also, explanation for those same configurations is omitted.

The liquid crystal display-timing controller 34 outputs the gate clock signal GCK 1a, as illustrated in FIG. 3. The gate clock signal GCK 1a is input to the CPLD 54. The CPLD 54 generates, in the non-display period, a correction synchronizing signal (a gate clock signal GCK1b) which has the same cycle as the gate clock signal GCK1a. The specific configuration to generate the correction synchronizing signal (the gate clock signal GCK 1b) will be described below. The liquid crystal display-timing controller 34 is one of examples of timing controllers according to the present disclosure.

The switch circuit 61 in the CPLD 54 inputs the gate clock signal GCK 1a to the delay circuit 60 in the display period. That is, the switch circuit 61 performs a switching operation between the input the gate clock signal GCK 1a and the gate clock signal GCK 1b so as to output the gate clock signal GCK 1a in the display period and output the gate clock signal GCK 1b to the delay circuit 60 in the non-display period. The delay circuit 60 in the CPLD 54 outputs, to the touch panel control board 70, a gate clock signal GCK 2, which is provided by adding a predetermined delay amount to the gate clock signal GCK 1a or the gate clock signal GCK 1b, each of which is input from the switch circuit 61.

Note that the delay circuit 60 may be omitted in the touch display panel 10a according to the present disclosure. When the delay circuit 60 is omitted, the CPLD 54 outputs the gate clock signal GCK 1a or the gate clock signal GCK 1b, as the gate clock signal GCK 2, to the touch panel control board 70.

The MCU may set the delay amount Ld in advance.

Specifically, the MCU 56 measures in advance a period from a raising timing of the gate clock signal GCK 1a to an occurrence timing of the gate drive noise N (a delay time AN). For example, during an inspection process performed after the touch panel display 10a is manufactured, the above-described period is measured by inputting the gate clock signal GCK 1a to the gate driver 32a and causing the liquid crystal display-timing controller 34 to generate the gate drive noise N on the touch panel display 10a. The MCU 56 sets the delay amount Ld based on the measured period.

For example, the MCU 56 sets, as the delay amount Ld, a period from the rising timing of the gate clock signal GCK 1a to a timing immediately before an occurrence of the gate drive noise N. In this manner, the delay amount Ld may be set individually for every touch panel display 10a.

The CPLD 54 adds the delay amount Ld which the MCU 56 sets, to the gate clock signal GCK 1a or the gate clock signal GCK 1b to generate the gate block signal GCK 2. The gate clock signal GCK 2 generated by the CPLD 54 is input to the DBE 72 of the touch panel control board 70.

The DBE 72 drives the touch panel 36 based on the gate clock signal GCK 2 which the CPLD 54 generates. Specifically, the DBE 72 cooperates with the AEF 74 to generate the drive signal Tx and, at the same time, stops inputting the drive signal Tx to the touch panel 36 during the predetermined standby period Lw referring to the gate clock signal GCK 2 as a reference. Eventually, the touch panel 36 is in the standby state during the standby period Lw. In other word, the operation of the touch panel 36 is inoperative during the standby period Lw.

Figure 4:
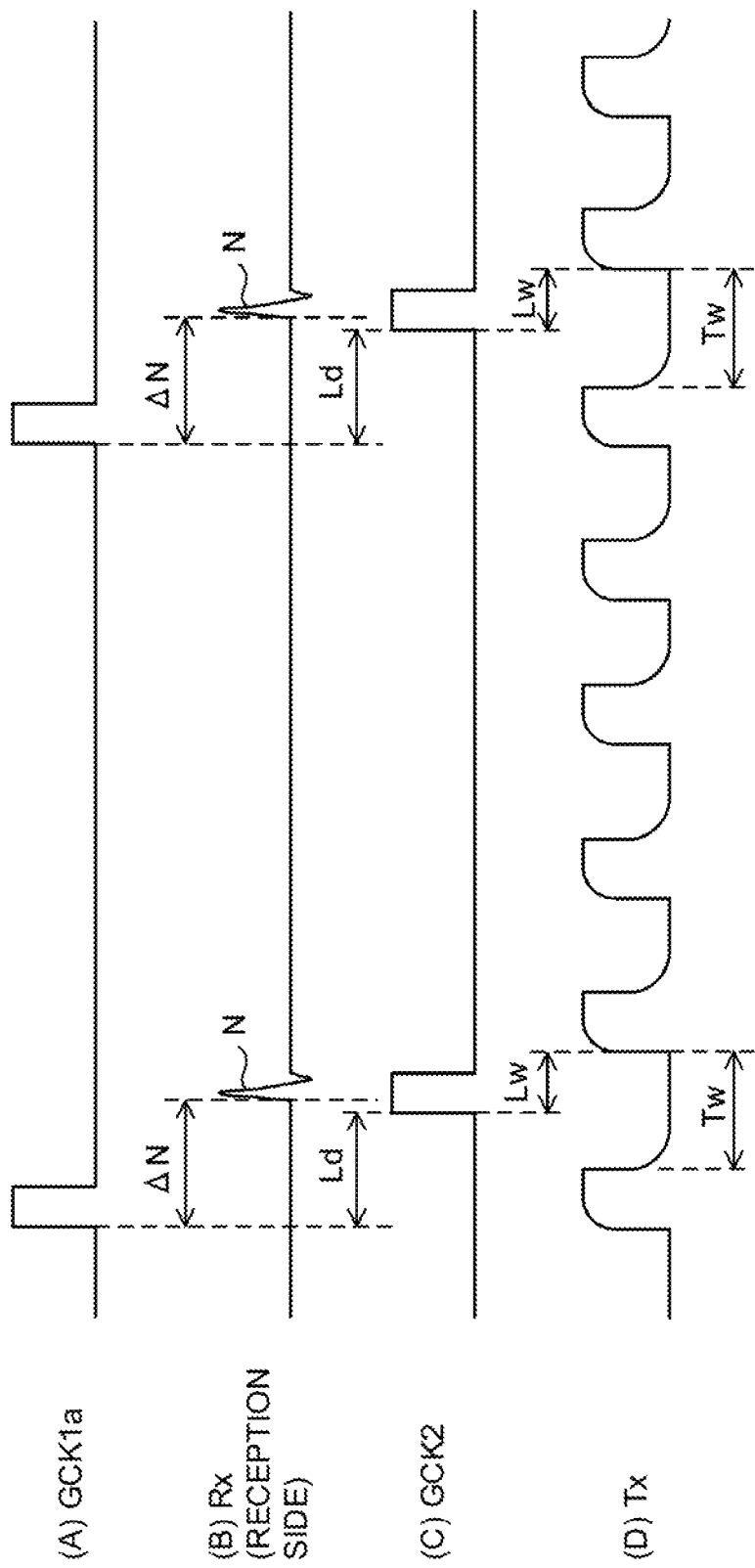
FIG. 4 is a waveform diagram schematically illustrating one example of a main signal according to the exemplary embodiment of the present disclosure.

Note that if the occurrence timing of the gate drive noise N falls within the standby period Lw, specifically, if a period during which the gate drive noise N occurs falls within the standby period Lw, the affection of the gate drive noise N can be avoided. For example, this situation is illustrated as shown in FIG. 4.

It is assumed that the delay time AN exists between the gate clock signal GCK 1a (or the gate clock signal GCK 1b) illustrated in FIG. 1A and the gate drive noise N illustrated in FIG. 1B. Then, the delay circuit 60 adds the delay amount Ld provided by the delay circuit 60 to the gate clock signal GCK 1a, thereby generating the gate clock signal GCK 2 illustrated in FIG. 4C. In addition, inputting the drive signal Tx illustrated in FIG. 4D to the touch panel 36 is halted during the predetermined standby period Lw referring to the gate clock signal GCK 2 as a reference, more specifically, referring to the rising timing of the gate clock signal GCK 2 as a reference, for example. That is, more specifically, generating the pulse of the drive signal Tx is halted. On the other hand, the gate drive noise N occurs on the reception side of the AFE 74 which is the input destination of the position signal Rx of the touch panel 36 illustrated in FIG. 4B. Note that if the occurrence timing of the gate drive noise N, more specifically, a period during which the gate drive noise N occurs falls within the standby period Lw, the affection of the gate drive noise N can be avoided.

A timing at which the standby period Lw is formed, for example, a timing at which the standby period starts, is determined based on the delay amount Ld set by the delay circuit 60. Therefore, the delay circuit 60 may set the delay amount Ld in advance so that a period during which the gate drive noise N occurs falls within the standby period Lw. According to this, the touch panel display 10a does not drive the touch panel 36 during a period from the rising timing of the gate clock signal GCK 2 to an end timing of an occurrence period of the gate drive noise N.

Therefore, the affection of the gate drive noise N can be avoided.

Also, the touch panel display 10a drives the touch panel 36 based on the gate clock signal GCK 2 which is provided by delaying the gate clock signal GCK 1a or the gate clock signal GCK 1b according to the occurrence timing of the gate drive noise N. Specifically, the CPLD 54 generates the gate clock signal GCK 2 so that the generation timing of the gate drive signal GCK 2 is concurrent with the occurrence timing of the gate drive noises N, and the DBE 72 generates the drive signal Tx based on the gate clock signal GCK 2 and inputs the generated drive signal Tx to the touch panel 36. According to this, the standby period Lw (see FIG. 4) can be shorted, compared with the configuration illustrated in FIG. 2. Since the standby period Lw can be shortened, the inoperative period Tw can be shortened in the same manner. So, the number of times of scanning of the touch panel 36 within the one frame can be increased (five times in FIG. 4) and the accuracy of position detection can be upgraded.

The touch panel display 10a is one of examples of the touch panel display according to the present disclosure. The touch panel control board 70 is one of examples of a touch panel driver according to the present disclosure. Also, the liquid crystal panel 32 is one of examples of a display panel according to the present disclosure and the liquid crystal display-timing controller 34 is one of examples of a timing controller according to the present disclosure. The CPLD 54 is one of examples of a signal generator according to the present disclosure.

The exemplary embodiment described above illustrates a signal waveform that becomes active when a gate clock signal (high active) is in high level. But the signal waveform that becomes active when the gate clock signal is in low level (low active) may be also used. When the gate clock signal is of a low active signal, the touch panel 36 operates with reference to a trailing timing.

In the touch panel display 10a, the CPLD 54 monitors an input of the gate clock signal GCK 1a and, when the gate clock signal GCK 1a is input (the display period), the CPLD 54 adds the delay amount Ld to the gate clock signal GCK 1a to generate the gate clock signal GCK 2. On the other hand, when the gate clock signal GCK 1a is not input in predetermined cycle (the non-display period), the CPLD 54 adds the delay amount Ld to the gate clock signal GCK 1b generated based on a cycle of the gate clock signal GCK 1a to generate the gate clock signal GCK2.

For example, the CPLD 54 measures a drive frequency in advance and generates a pulse signal (the gate clock signal GCK 1b) of the drive frequency when the gate clock signal GCK 1a is not input (the non-display period). In other word, CPLD 54 simulatively generates the gate clock signal GCK 1a. Then, the CPLD 54 adds the delay amount Ld to the generated gate clock signal GCK 1b to generate the gate clock signal GCK 2. The CPLD 54 inputs the generated gate clock signal GCK 2 into the DBE 72 of the touch panel control board 70. Note that when the delay amount Ld has not be considered, the CPLD 54 inputs, as the gate clock signal GCK 2, the gate clock signal GCK 1b to the DBE 72 of the touch panel control board 70 in the non-display period.

The gate clock signal GCK 2 and the gate clock signal GCK 1b are one of examples of the correction synchronizing signal according to the present disclosure.

Figure 5:
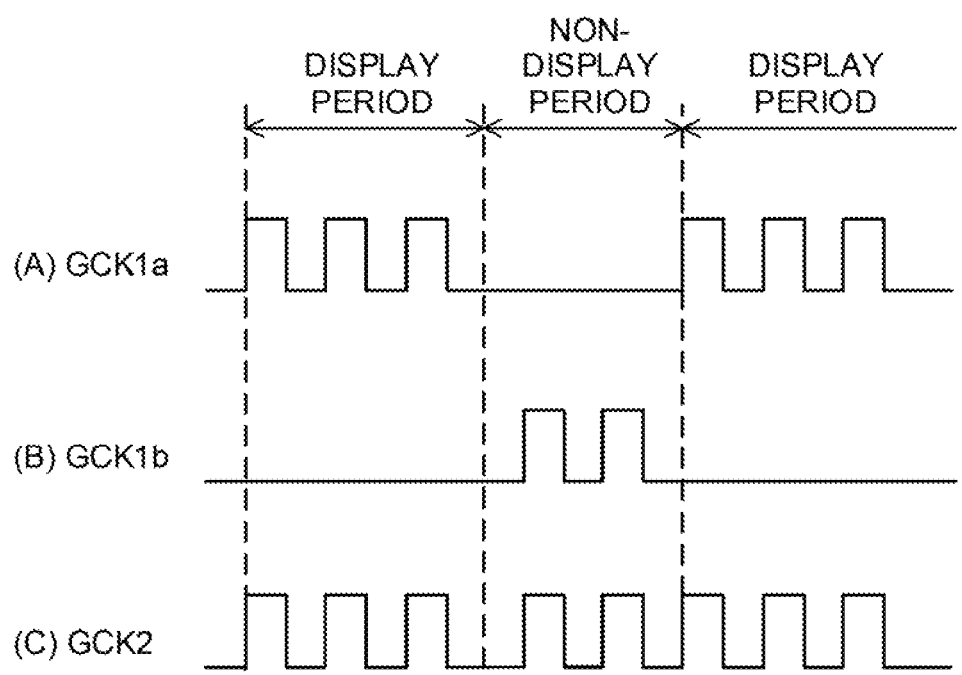
FIG. 5 is a waveform diagram schematically illustrating one example of a gate clock signal according to the exemplary embodiment of the present disclosure.

FIG. 5A illustrates a gate clock signal GCK 1a which the liquid crystal display-timing controller 34 outputs in the display period. FIG. 5B illustrates a gate clock signal GCK 1b which the CPLD 54 generates in the non-display period. FIG. 5C illustrates the gate clock signal GCK 2 which is generated based on the gate clock signal GCK 1a and the gate clock signal GCK 1b. The delay amount Ld is omitted in FIG. 5.

When the DBE 72 obtains the gate clock signal GCK 2 in the display period and the non-display period, the DBE 72 cooperates with the AFE 74 to generate the drive signal Tx based on the gate clock signal GCK 2, and then inputs the generated drive signal Tx to the touch panel 36. According to this, the touch panel 36 operates both in the display period and in the non-display period. Therefore, this configuration can prevent the the touch panel 36 from being inoperative in the non-display period during which the liquid crystal 32 does not operates. Thus, it become possible that the touch panel 36 can restore the normal state from the standby state in accordance with the user having a touch on the touch panel 36 even when the image signal is not input.

Note that the touch panel display 10a may measure the cycle of the gate clock signal GCK 1a (the drive frequency) in the process of the inspection performed after the touch panel display 10a is manufactured, and may generate the gate clock signal GCK 1b (the correction synchronizing signal) which has the same cycle as the cycle of the gate clock signal GCK 1a, to store the gate clock signal GCK 1b.

Figure 6:
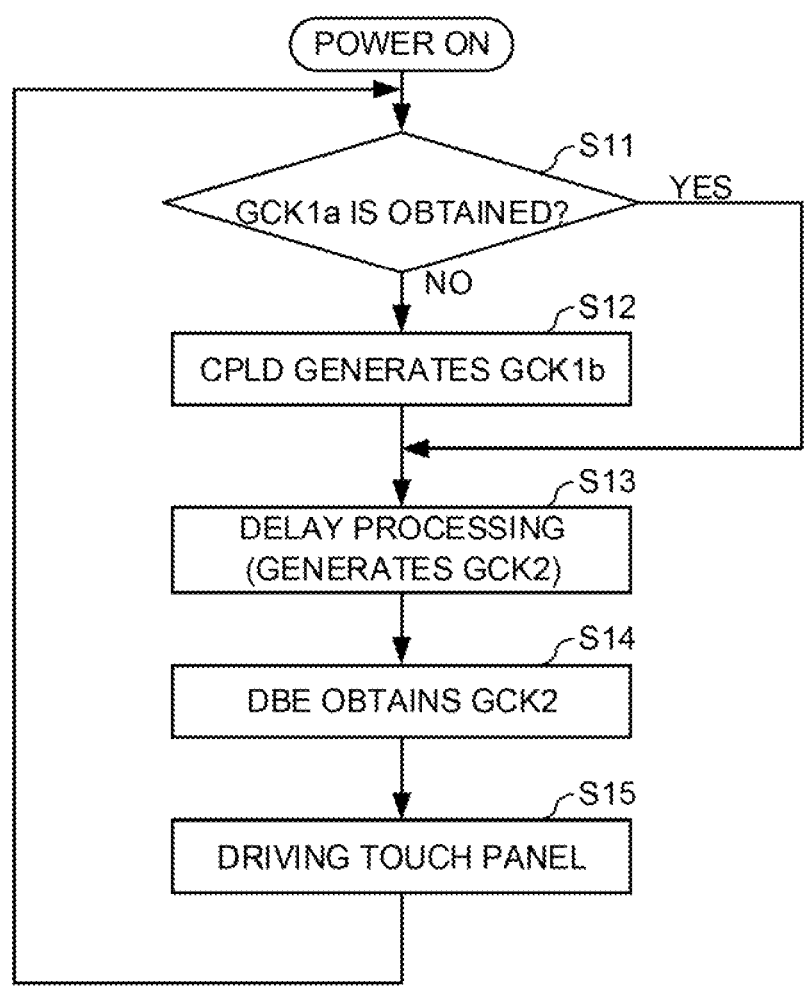
FIG. 6 is a flowchart illustrating a flow of an operation of whole of the touch panel display according to the exemplary embodiment of the present disclosure.

Next, FIG. 6 illustrates a flow of whole processing of the touch panel display 10a.

As illustrated in FIG. 6, when power of the touch panel display 10a is turned on to be started up, in step S11, the CPLD 54 monitors the input of the gate clock signal GCK 1a which the liquid crystal display-timing controller 34 outputs. If the CPLD 54 obtains the gate clock signal GCK 1a, the processing proceeds to step S13. If the CPLD 54 does not obtain the gate clock signal GCK 1a, the processing proceeds to step S12.

For example, in the display period during which the image signal D1 is input to the scaler 52, since the liquid crystal display-timing controller 34 outputs the gate control signal GCK 1a, the CPLD 54 obtains the gate clock signal GCK 1a. On the other hand, in the non-display period during which the image signal D1 is not input to the scaler 52, since the liquid crystal display-timing controller 34 does not output GCK 1a, the CPLD 54 cannot obtain the gate clock signal 1a.

Note that the CPLD 54 measures in advance the cycle of the gate clock signal GCK 1a which is obtained in the display period. If the gate clock signal GCK 1a is not input from the liquid crystal display-timing controller 34 at a timing corresponding to the measured cycle, the CPLD 54 determines that the CPLD 54 does not obtain the gate clock signal GCK 1a.

If the CPLD 54 cannot obtain the gate clock signal GCK 1a at the predetermined cycle ("NO" in step S11), that is, in the no-display period, the CPLD 54 generates the gate clock signal GCK 1b in step S12. Specifically, the CPLD 54 measures in advance the cycle of the gate clock signal GCK 1a (the drive frequency) and generates, as the gate clock signal GCK 1b, the pulse signal which has the same cycle as the cycle of the gate clock signal GCK 1a.

If the CPLD 54 obtains the gate clock signal GCK 1a ("YES" in step S11) or the CPLD 54 generates the gate clock signal GCK 1b (step S12), the CPLD 54 generates the gate clock signal GCK 2 in step S13. Specifically, the CPLD 54 (the delay circuit 60) adds the delay amount Ld set by the MCU 56 in advance, to the gate clock signal GCK 1a or the gate clock signal GCK 1b to generate the gate clock signal GCK 2. In other ward, in the display period, the CPLD 54 adds the delay amount Ld to the gate clock signal GCK 1a to generate the gate clock signal GCK 2. On the other hand, in the non-display period, the CPLD 54 adds the delay amount Ld to the gate clock signal GCK 1b to generate the gate clock signal GCK 2. Then, the CPLD 54 inputs the generated gate clock signal GCK 2 to the DEB 72 of the touch panel control board 70.

Next, in step S14, the DBE 72 of the touch panel control board 70 obtains the gate clock signal GCK 2 which the CPLD 54 outputs.

Next, in step S15, the touch panel control board 70 starts driving the touch panel 36 based on the gate clock signal GCK 2. In other word, the touch panel control board 70 starts inputting the drive signal Tx to the touch panel 36 and starts receiving the input of the position signal Rx from the touch panel 36. According to this, the whole of the touch panel display 10a including the touch panel 36 is started up. Subsequently, the processing goes back to step S11, and the above-described processing is repeated. Note that the series of the processing ends when the power of the touch panel display 10a is turned off.

As described above, the CPLD 54 generates the correction synchronizing signal (the gate clock signal GCK 1b) based on the gate clock signal GCK 1a obtained from the liquid crystal display-timing controller 34 in the display period and outputs the generated correction synchronizing signal to the touch panel control board 70 in the non-display period.

The touch panel display 10a drives, in the display period, the touch panel 36 based on the gate clock signal GCK 1a output from the liquid crystal display-timing controller, 34 and in the non-display period, the touch panel display 10a generates the correction synchronizing signal (the gate clock signal GCK 1b) which has the same cycle with the gate clock signal GCK 1a and drives the touch panel 36 based on the generated corrective synchronizing signal, Since this configuration can prevent the touch panel 36 from being inoperative in the non-display period, the touch panel 36 can restore the normal state from the standby state when the user has a touch on the touch panel 36.

According to the touch panel display 10a, the proper delay amount Ld is set in the delay circuit 60 based on the cycle of the gate clock signal GCK 1a and the occurrence timing of the gate drive noise N, and the drive signal Tx is input to the touch panel 36 based on the gate clock signal GCK 2 which is provided by delaying the gate clock signal GCK 1a by the delay amount Ld. Therefore, the affection caused by the gate drive noise N can be avoided. In addition, since the standby period Lw and the inoperative period Tw (see FIG. 4) can be shortened, the number of times of scanning of the touch panel 36 within the one frame can be increased and the accuracy of position detection can upgraded.

The touch panel display according to the present disclosure is not limited to the above-described configurations. For example, the touch panel display 10a may generate the gate clock signal GCK 1b in accordance with configurations described below (modified examples), when the gate clock signal GCK 1a is not input. In the modified examples described below, the touch panel display 10a is configured to dynamically generate the gate clock signal GCK 1b every time when the touch panel display 10a detects that the gate clock signal GCK 1a is not input.

First Modified Example

A touch panel display 10a according to the first modified example monitors and stores the gate clock signal GCK 1a and, when the gate clock signal 1a is not input (in the non-display period), generates a signal waveform (a pulse wave) which has the same cycle as the cycle of the store gate clock signal GCK 1a (the drive frequency).

Figure 7:
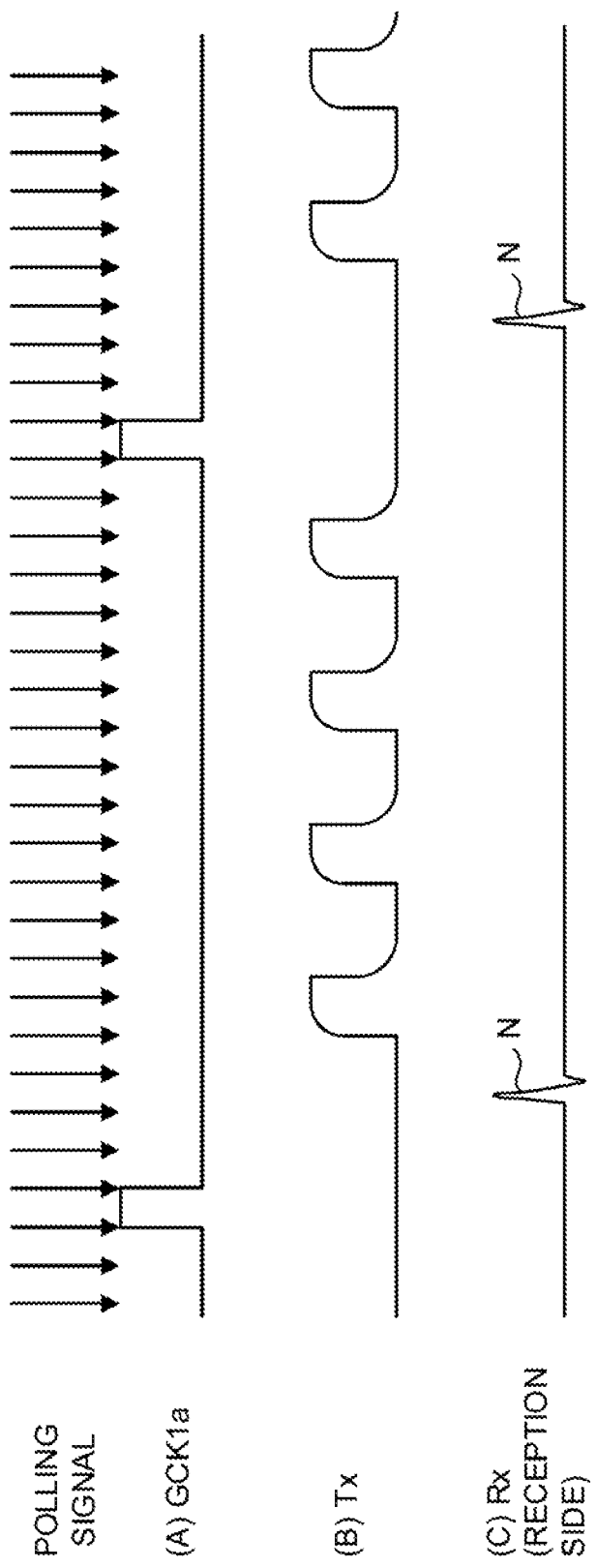
FIG. 7 is a waveform diagram illustrating one example of polling processing for the gate clock signal according to the exemplary embodiment of the present disclosure.

Specifically, as illustrated in FIG. 7, the CPLD 54 samples (polls) the gate clock signal GCK 1a which is input in the display period and measures (counts) an interval between adjacent rising edges. Then, the CPLD 54 obtains the cycle of the gate clock signal GCK 1a and generates, as the gate clock signal GCK 1b (the correction synchronizing signal), the pulse signal having the same cycle as the cycle of the gate clock signal GCK 1a. Also, the CPLD 54 stores a duty ratio of high level and low level of the gate clock signal GCK 1a to generate the gate clock signal GCK 1b. For example, the CPLD 54 samples the gate clock signal GCK 1a for ten cycles and generates the gate clock signal GCK 1b by using an average of the 10 cycles.

Second Modified Example

Figure 8:
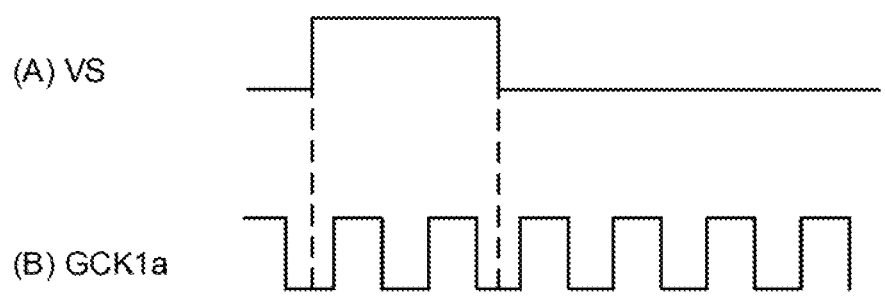
FIG. 8 is a waveform diagram illustrating one example of a vertical synchronizing signal and the gate clock signal according to the exemplary embodiment of the present disclosure.

The touch panel display 10a uses the gate drive timing as a rewriting timing for a synchronizing signal. As the period during which the liquid crystal panel 32 is not driven, there are a back porch period or a front porch period. When using such a timing, the touch panel display 10a monitors a plurality of signals to generate the gate clock signal GCK 1b. The vertical synchronizing signal VS (FIG. 8A) operates for 16 ms and has a dummy drive period before and after the operation. The gate clock signal GCK 1a (FIG. 8) with a gate drive waveform is a dummy and does not actually function to drive. Also, the touch panel display 10a interpolates a plurality of signal (generates the gate clock signal GCK 1b) even when the touch panel display 10a uses a plurality of signals.

Third Modified Example

A method described below may be applied as a method for detecting that the gate clock signal GCK 1a is not input, that is, a method for detecting the non-display period. For example, the CPLD 54 detects that the rising edge of the pulse signal (the gate clock signal GCK 1a) does not occur at the premeasured cycle, thereby detecting the non-display period. For example, when the CPLD 54 cannot detect the rising edge at the timing at which the rising edge should be detected, in sampling (polling) of the gate clock signal GCK 1a illustrated in FIG. 7, the CPLD 54 detects that the gate clock signal GCK 1a is not input so that the display is turned off, that is, detects the no-display period. In the processing to detect that the rising edge does not occur, since the CPLD 54 may make a misdetection if the detection is done once, the CPLD 54 may determine that the gate clock signal GCK a1 is not input only if it is detected a plurality of times (for example, three times).

Fourth Modified Example

The touch panel display 10a may measure a cycle of each synchronizing signal when the touch panel display 10a is started up, and may generate the gate clock signal GCK 1b when the rising edge of the gate clock signal GCK 1a, corresponding to the measured cycle, is not detected. According to this, since the touch panel display 10a stores the cycle measured when the touch panel display 10a is started up, there is no need that the touch panel display 10a detects once again the cycle of each synchronizing signal to generate the gate clock signal GCK 1a. Note that the above-described processing is to be executed once at starting up, since a system is not recombined while the power of the touch panel display 10a is turned on.

Figure 9:
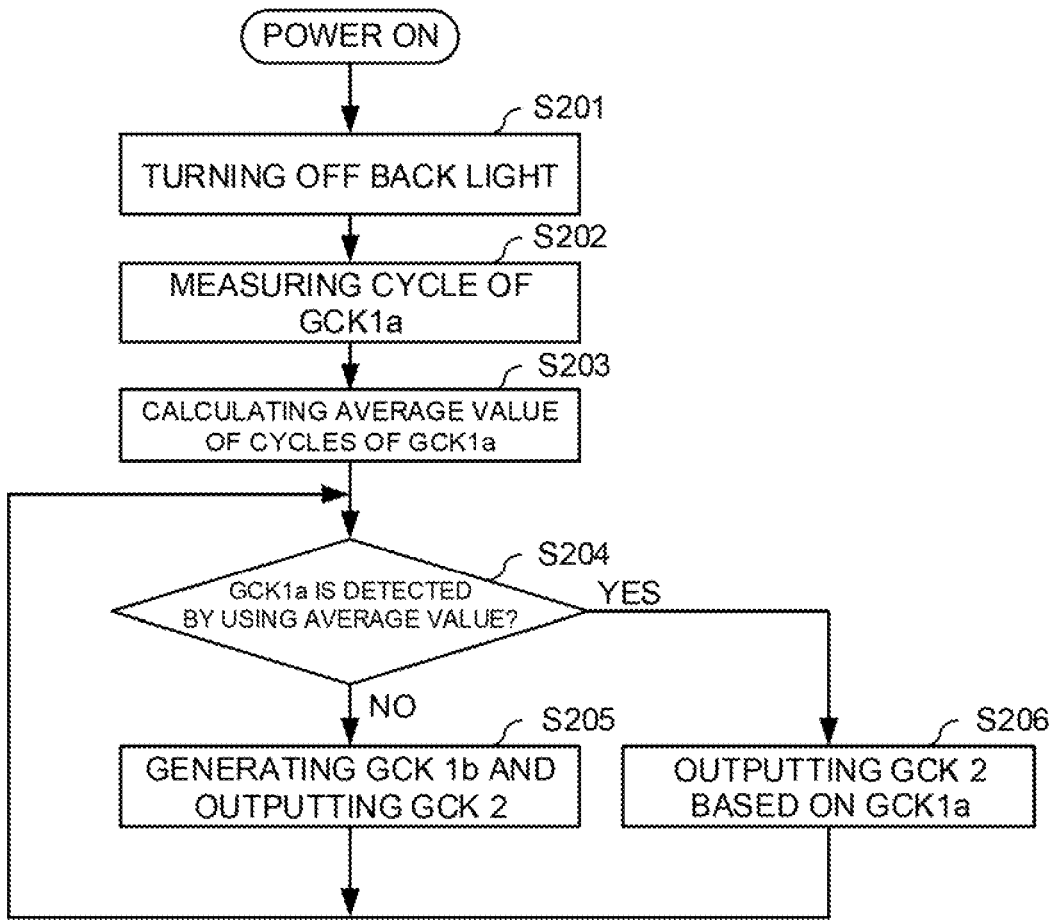
FIG. 9 is a flowchart illustrating a flow of an operation of the touch panel display according to a modified example of the exemplary embodiment of the present disclosure.

A flow of an operation for the touch panel display 10a corresponding to the modified examples is described below. A setting processing of the delay amount Ld is omitted. FIG. 9 is a flowchart illustrating a flow of an operation of the touch panel display 10a of the modified examples.

As illustrate in FIG. 9, after the power of the touch panel display 10a is turned off, in step S201, the scaler 52 uses the PWM signal to turn off the backlight (in other word, a black display).

Next, in step S202, the CPLD 54 monitors the gate clock signal GCK 1a and measures the cycle of the gate clock signal GCK 1a n times. Specifically, the number of times of the measurement (n) is set equal to or less than ten. The CPLD 54 performs one measurement in 7.5 μs.

Subsequently, in step S203, the CPLD 54 calculates an average value of the cycles (an average frequency) obtained by the n measurements.

Subsequently, in step S204, the CPLD 54 samples the gate clock signal GCK al to determine whether the rising edge of the pulse signal is detected. Here, the CPLD 54 determines whether the rising edge of the pulse signal is detected three times. If the CPLD 54 cannot detect the rising edge of the pulse signal three times ("NO" in step S204), then the processing proceeds to step S205. If the CPLD 54 can detect the rising edge of the pulse signal three times ("YES" in step S204), the processing proceeds to step S 206.

In step S205, the CPLD 54 generates the correction synchronizing signal (the gate clock signal GCK 1b) which has the same cycle as the average cycle, and outputs the generated correction synchronizing signal (the gate clock signal GCK 1b) as the gate clock signal GCK 2. The DBE 72 of the touch panel control board 70 obtains the gate clock signal GCK 2 which the CPLD 54 outputs (the gate clock signal GCK 1b). Subsequently, the processing goes back to step S204.

In step S206, the CPLD 54 outputs the gate clock signal GCK 1a as the gate clock signal GCK 2. The DBE 72 of the touch panel control board 70 obtains the gate clock signal GCK 2 (the gate clock signal GCK 1b) which the CPLD 54 outputs. Subsequently, the processing foes back to step S204.

Also, the CPLD 54 outputs the gate clock signal GCK 2 added with the delay amount Ld, when the delay amount is set in advance. The touch panel control board 70 starts driving the touch panel 36 based on the gate clock signal GCK 2 obtained from the CPLD 54, that is, the touch panel control board 70 start inputting the drive signal Tx to the touch panel 36, and starts receiving the position signal Rx from the touch panel 36. According to this, the whole of the touch panel 10a including the touch panel 36 is started up. This configuration can prevent the touch panel 36 from being inoperative in the non-display period.

The processing described above is executed every time when the touch panel display 10a is started up. Therefore, the touch panel display 10a can dynamically execute an interpolation processing of the gate clock signal in the non-display period.

The present disclosure may be allied to an electronic black board described above. In other word, a trajectory of the touch position where the user has a touch on the touch panel 36 is displayed on the screen of the liquid crystal panel 32. If the affection caused by the gate drive noise N is not avoided in the electronic black board, an unintentional and disappointing pattern such as a dot or a line which has nothing to do with the user' touch operation on the touch panel 36 is displayed on the liquid crystal panel 32 due to the affection of the gate drive noise N. The present disclosure is preferable to avoiding this inconvenience.

The present disclosure also can be applied to a configuration which uses not the liquid crystal module 30 but an electro luminance display of an active-matrix driving method, for example. In other word, the present disclosure can be applied to the configuration using a display device of the the active-matrix driving method. The present disclosure also can be applied to a display device other than the display device of the active-matrix driving method, for example, a display device of a simple-matrix driving method or a display device of a cathode ray tube type while this is an extreme example.

The scope of the present disclosure is not limited to the scope described here but is construed based on the scope of the claims. In this case, all meanings and scopes equivalent to the scope of the claims are included.

It is to be understood that the embodiments herein are illustrative and not restrictive, since the scope of the disclosure is defined and all changes that fall within metes and bounds of the claims, or equivalence of such metes and bounds thereof are therefore intended to be embraced by the claims.

The invention claimed is:

1. A touch panel display including a display panel and a touch panel which is superposed on the display panel and outputs a position signal corresponding to a touch position where a user has a touch on the touch panel, the touch panel display comprising
   a timing controller that outputs a gate clock signal to control drive timings of a plurality of gate lines provided on the display panel in a display period during which an image corresponding to an image signal is displayed on the display panel;
   a gate driver that, in the display period, outputs signals to turn on a thin film transistor to the plurality of gate lines in sequence on the basis of the gate clock signal output from the timing controller;
   a signal generator that generates a correction synchronizing signal which has the same cycle as the gate clock signal, during a non-display period that the image is not displayed on the display panel; and
   a touch panel driver that drives the touch panel in the display period on the basis of the gate clock signal output from the timing controller and drives the touch panel in the non-display period on the basis of the correction synchronizing signal output from the signal generator, wherein
   the timing controller outputs the gate clock signal in the display period, and does not output the gate clock signal in the non-display period, and
   the signal generator generates the correction synchronizing signal on the basis of the gate clock signal obtained from the timing controller, in the display period and outputs the correction synchronizing signal to the touch panel driver in both of the display period and the non-display period.

2. The touch panel display according to claim 1, wherein the signal generator samples the gate clock signal at a predetermined cycle to measure an interval of rising edges of the gate clock signal and thereby generates the correction synchronizing signal which has the same cycle as the gate clock signal.

3. The touch panel display according to claim 2, wherein the signal generator detects, in the sampling of the gate clock signal, the non-display period when the rising edge of the gate clock signal is not detected at a timing at which that the rising edge should be detected.

4. The touch panel display according to claim 1, wherein the signal generator measures a cycle of the gate clock signal when the touch panel display is started up, and generates the correction synchronizing signal when the rising edge of the gate clock signal, corresponding to the measured cycle, is not detected.

5. A control method of a touch panel display including a display panel and a touch panel which is superposed on the display panel and outputs a position signal corresponding to a touch position where a user has a touch on the touch panel, the control method comprising:

outputting a gate clock signal to control drive timings of a plurality of gate lines provided on the display panel in a display period during which an image corresponding to an image signal is displayed;

in the display period, outputting signals to turn on a thin film transistor to the plurality of gate lines in sequence on the basis of the output gate clock signal;

generating a correction synchronizing signal which has the same cycle as the gate clock signal, in a non-display period during which the image is not displayed on the display panel; and driving the touch panel in the display period on the basis of the output gate clock signal and driving the touch panel in the non-display period on the basis of the correction synchronizing signal, wherein the gate clock signal is output in the display period, and is not output in the non-display period, and the correction synchronizing signal is generated on the basis of the gate clock signal obtained, in the display period and the correction synchronizing signal is output in both of the display period and the non-display period.

\* \* \* \* \*